United States Patent
Borgel et al.

(10) Patent No.: US 11,578,782 B1
(45) Date of Patent: Feb. 14, 2023

(54) GUY WIRE CONNECTOR FOR CEILING FAN

(71) Applicant: DELTA T, LLC, Lexington, KY (US)

(72) Inventors: Brian Borgel, Lexington, KY (US); Igor Davidenko, Lexington, KY (US); Richard A. Oleson, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 464 days.

(21) Appl. No.: 16/555,679

(22) Filed: Aug. 29, 2019

Related U.S. Application Data

(60) Provisional application No. 62/864,099, filed on Jun. 20, 2019, provisional application No. 62/724,386, filed on Aug. 29, 2018.

(51) Int. Cl.
| | |
|---|---|
| *F16G 11/03* | (2006.01) |
| *F04D 29/64* | (2006.01) |
| *F04D 25/08* | (2006.01) |
| *F16G 11/12* | (2006.01) |
| *F16G 11/04* | (2006.01) |
| *F16L 3/06* | (2006.01) |
| *F04D 29/60* | (2006.01) |

(52) U.S. Cl.
CPC ............ *F16G 11/03* (2013.01); *F04D 25/088* (2013.01); *F04D 29/646* (2013.01); *F16G 11/044* (2013.01); *F16G 11/12* (2013.01); *F16L 3/06* (2013.01); *F04D 29/601* (2013.01)

(58) Field of Classification Search
CPC .... F04D 19/002; F04D 25/088; F04D 29/263; F04D 29/325; F04D 29/4226; F04D 29/646; F04D 29/601; F16G 11/12; F16G 11/03; F16G 11/044
See application file for complete search history.

(56) References Cited

U.S. PATENT DOCUMENTS

| | | | |
|---|---|---|---|
| 3,124,330 | A | 3/1964 | Robinson |
| 4,064,427 | A | 12/1977 | Hansen et al. |
| 4,560,321 | A | 12/1985 | Kawai |
| 5,085,392 | A | 2/1992 | Perna |
| 5,292,228 | A * | 3/1994 | Dye ........................ F04D 25/08 D23/385 |
| 5,711,397 | A | 1/1998 | Flora et al. |
| 6,619,919 | B2 | 9/2003 | Russell |
| 6,709,238 | B2 | 3/2004 | Marshall |
| 6,881,037 | B2 | 4/2005 | Marshall |
| 7,625,186 | B1 | 12/2009 | Lueddecke |
| 8,480,041 | B2 | 7/2013 | Myers |
| 8,931,747 | B2 | 1/2015 | Davis |
| 9,982,679 | B2 * | 5/2018 | Santolucito ........... F04D 29/329 |
| 10,844,866 | B2 * | 11/2020 | Eggers ................... E04B 9/006 |
| 2004/0195479 | A1 | 10/2004 | Gulley |

(Continued)

*Primary Examiner* — Anita M King
(74) *Attorney, Agent, or Firm* — Dickinson Wright PLLC; Andrew D. Dorisio

(57) ABSTRACT

An apparatus for connecting one or more guy wires to a down rod, the connector having first and second separable portions which form an aperture for receiving the down rod. At least one of the first or second portions includes at least one passage adapted for releasably receiving a portion of the guy wire. The guy wire may include an anchor, and the passage for receiving the guy wire may be adapted for capturing the anchor so as to preclude movement of the guy wire in a radial direction.

16 Claims, 12 Drawing Sheets

(56) References Cited

U.S. PATENT DOCUMENTS

| | | |
|---|---|---|
| 2005/0189456 A1 | 9/2005 | Hoffmann |
| 2006/0024127 A1 | 2/2006 | Heath |
| 2007/0090242 A1 | 4/2007 | Gulley |
| 2008/0107527 A1 | 5/2008 | Gajewski |
| 2009/0152426 A1 | 6/2009 | Longton et al. |
| 2014/0137388 A1* | 5/2014 | Campbell ............. F16G 11/146 29/461 |
| 2015/0260199 A1* | 9/2015 | Hollan .................. F04D 25/088 248/342 |

* cited by examiner

GUY WIRE CONNECTOR FOR CEILING FAN

The entire disclosures of U.S. patent application Ser. No. 14/439,801 and U.S. Provisional Patent Application Ser. Nos. 62/724,386 and 62/864,099 are fully incorporated herein by reference.

BACKGROUND

When an environmental control apparatus, such as a ceiling fan, light fixture, or the like, is installed outdoors, it is inevitably exposed to wind forces which may be unpredictable. While it is possible to secure the supporting down rod rigidly to the ceiling to prevent lateral movement caused by wind, this introduces a risk of applying moment forces to the electrical box or ceiling structure, which they were not designed to bear. For this reason, it is desirable in these circumstances to secure the down rod with guy wires, which are able to distribute the load of lateral forces broadly across the ceiling structure, providing robust support to the fan or light without imposing excessive forces on the ceiling structure.

Typically, the attachment of a guy wire to a down rod is made difficult by the lack of any fixed attachment location. While it is possible to directly attach guy wire anchors to the sides of the down rod by screws or similar means, this may result in the radial position of the guy wires not being suitably aligned with available attachment points on the building structure; therefore it is more common to use clamps which can be rotated as necessary to properly orient the guy wires. The use of clamps, which are secured by friction, permits the guy wire anchors to slide along the axis of the down rod when under load, such as in a wind storm, resulting in the wires becoming slack and failing to perform their function adequately. In addition, known attachment means tend to be complex, difficult to install, and often unsightly when installed.

This disclosure addresses these concerns in a novel way, thereby making guy wires a more attractive and more reliable way of securing a ceiling fan against the possibility of damage from wind when installed outdoors.

SUMMARY

According to a first aspect of the disclosure, an apparatus for connecting one or more guy wires to a down rod associated with a ceiling fan is disclosed. The apparatus comprises a connector comprising first and second separable portions which form an aperture for receiving a down rod. At least one of the first or second portions includes at least one passage adapted for releasably receiving a portion of the guy wire. A second passage may be formed in each portion for receiving a fastener, wherein the passage has a longitudinal axis generally parallel to a tangent to the down rod. The first passage may intersect with the second passage.

Further, the guy wire may include an anchor, and the passage for receiving the guy wire may be adapted for capturing the anchor so as to preclude movement of the guy wire in a radial direction. The down rod may include a projection, and at least one of the first or second portions may include a groove for receiving the projection of the down rod such that axial movement of the connector is precluded while rotational movement is permitted.

In another embodiment, the first and second separable portions which comprise the connector may be identical. Each of the first and second portions may comprise an upper part and a lower part. The upper part may be identical to the lower part.

In another embodiment, at least one of the first or second portions of the connector includes at least one passage adapted for releasably receiving an end of the guy wire.

Another aspect of the disclosure relates to a method of manufacturing the first and second portions of the connector, wherein the first and second portions are molded components created in a single mold. The upper part and lower part of each of the first and second portions may further be molded components created in a single mold.

A final aspect of the disclosure relates to a method of supporting a ceiling fan. The method comprises assembling a connector to a down rod associated with the ceiling fan, the connector comprising first and second separable portions forming a passage for receiving the down rod. The method further comprises releasably connecting the guy wire to the connector.

BRIEF DESCRIPTION OF THE DRAWING FIGURES

DETAILED DESCRIPTION

The following description of certain examples of the invention should not be used to limit the scope of the disclosure. Other examples, features, aspects, embodiments, and advantages of the invention will become apparent to those skilled in the art from the following description, which includes by way of illustration, one or more of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
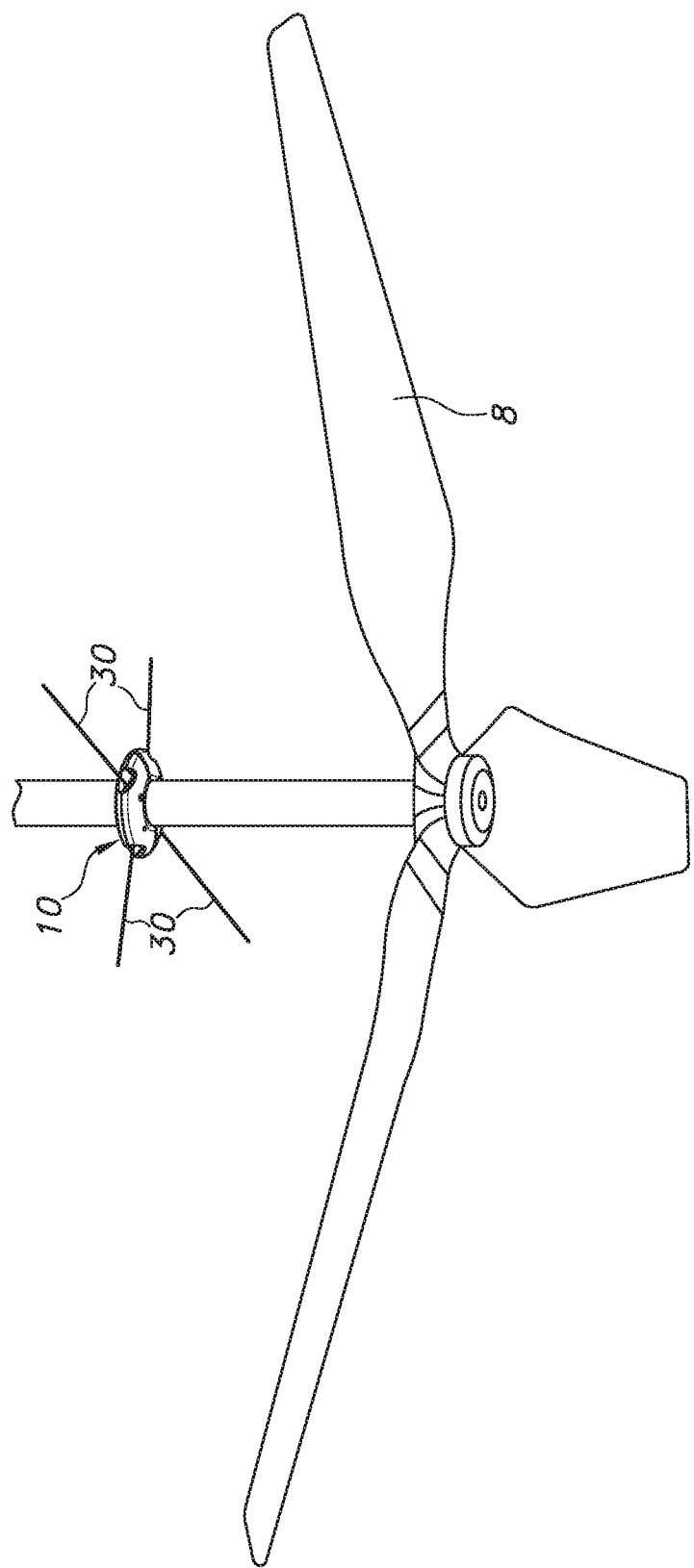
FIG. 1 illustrates an overall first embodiment of a trim guy wire connector in connection with a ceiling fan.
Figure 2:
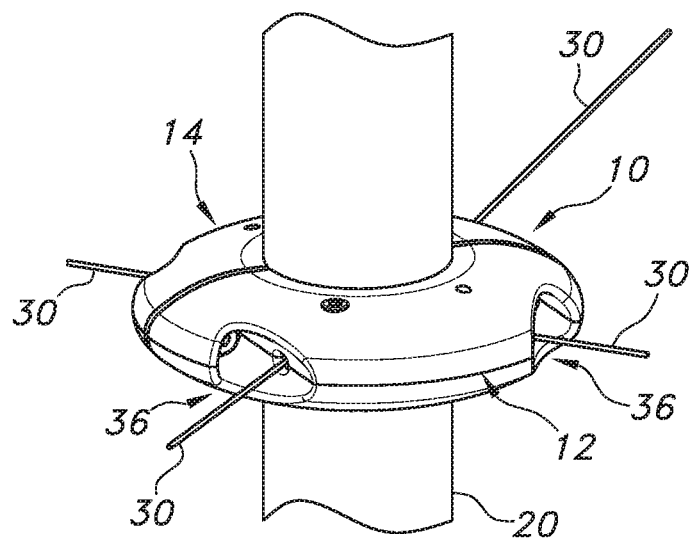
FIG. 2 illustrates an overall view of a first embodiment of a trim guy wire connector, as assembled on a typical down rod, with guy wires extending outwards in four directions.
Figure 3:
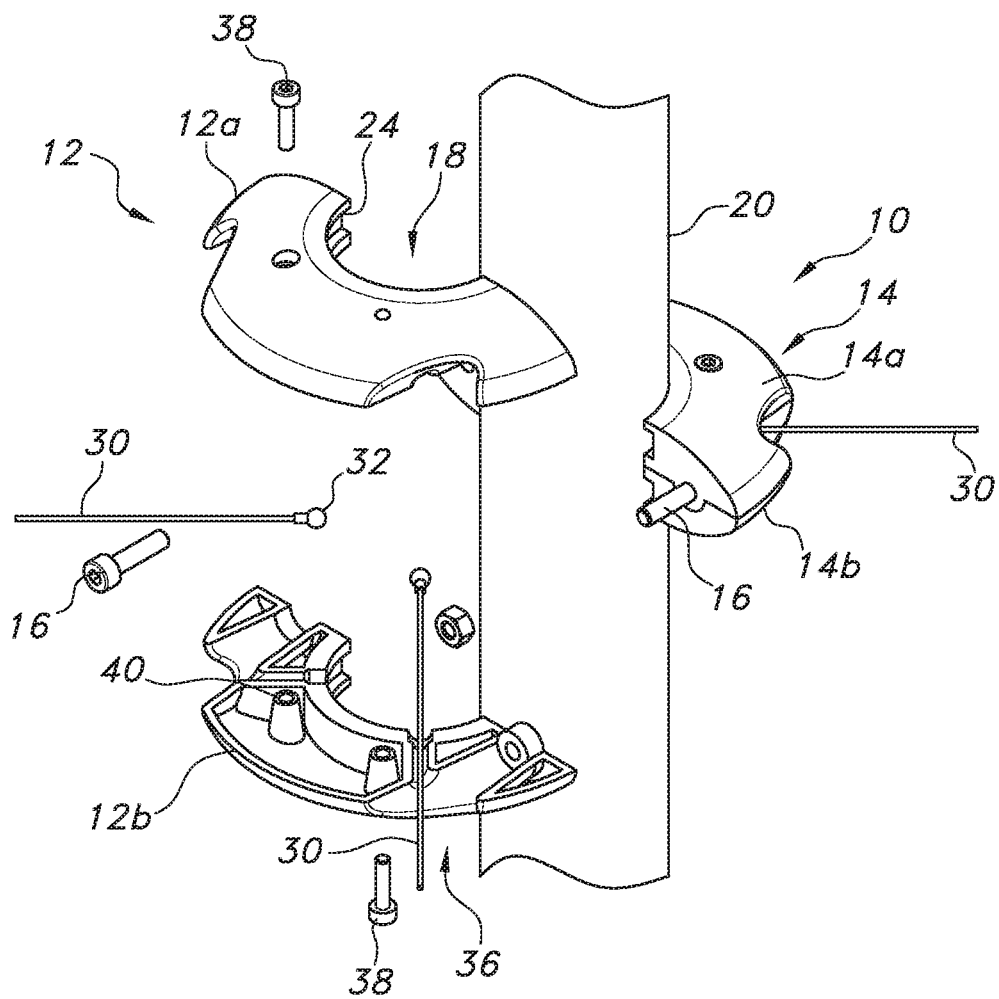
FIG. 3 shows the assembly of FIG. 1 in an exploded view, illustrating the manner in which the various components are assembled.

In one embodiment as shown in FIGS. 1-3, a connector 10 is shown. The connector 10 comprises complementary portions 12, 14. When fastened together by fasteners, such as screws 16, the complementary portions 12, 14 create a passage 18 for receiving a support for a fan, such as a tubular down rod 20 of a ceiling fan 8. As the screws 16 are tightened, the two portions 12, 14 exert a clamping force upon the periphery of the down rod 20 to secure the connector 10 via frictional engagement to the down rod.

Each of the two portions 12, 14 may comprise complementary components, which may be arranged as upper and lower parts 12a, 12b; 14a, 14b in the typical orientation in connection with a vertically oriented down rod 20, as shown. In this example, the only difference between the upper and lower parts 12a, 12b; 14a, 14b is that one is threaded to receive the corresponding threads of an attachment screw 38, while the other has a larger, unthreaded hole 40 in the same location to allow passage of the shank of the screw from the opposite half. Therefore, the upper and lower parts may both be formed in the same mold or casting die, with the threaded or enlarged hole being formed as a secondary operation on the finished casting. In this way, only one mold or casting die is needed to produce all four parts comprising the main body of the device.

Figure 4:
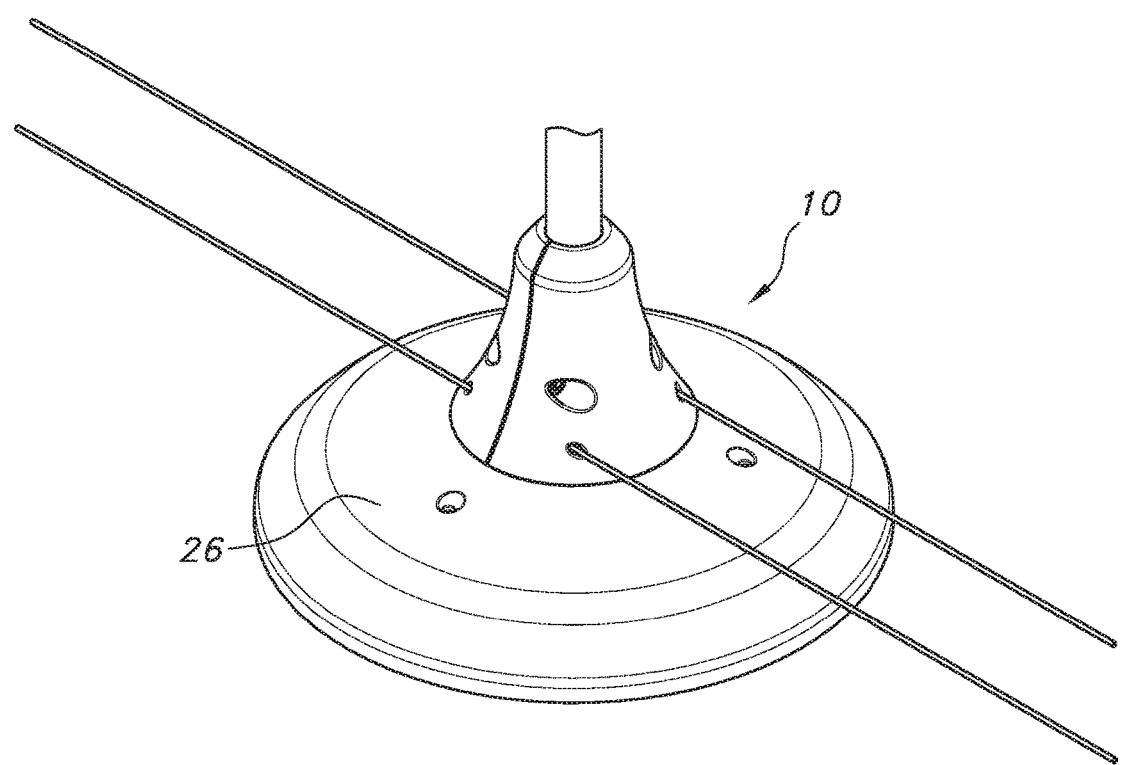
FIG. 4 illustrates an alternate embodiment of a trim guy wire connector, as assembled on a typical down rod, with guy wires extending in four directions.
Figure 5:
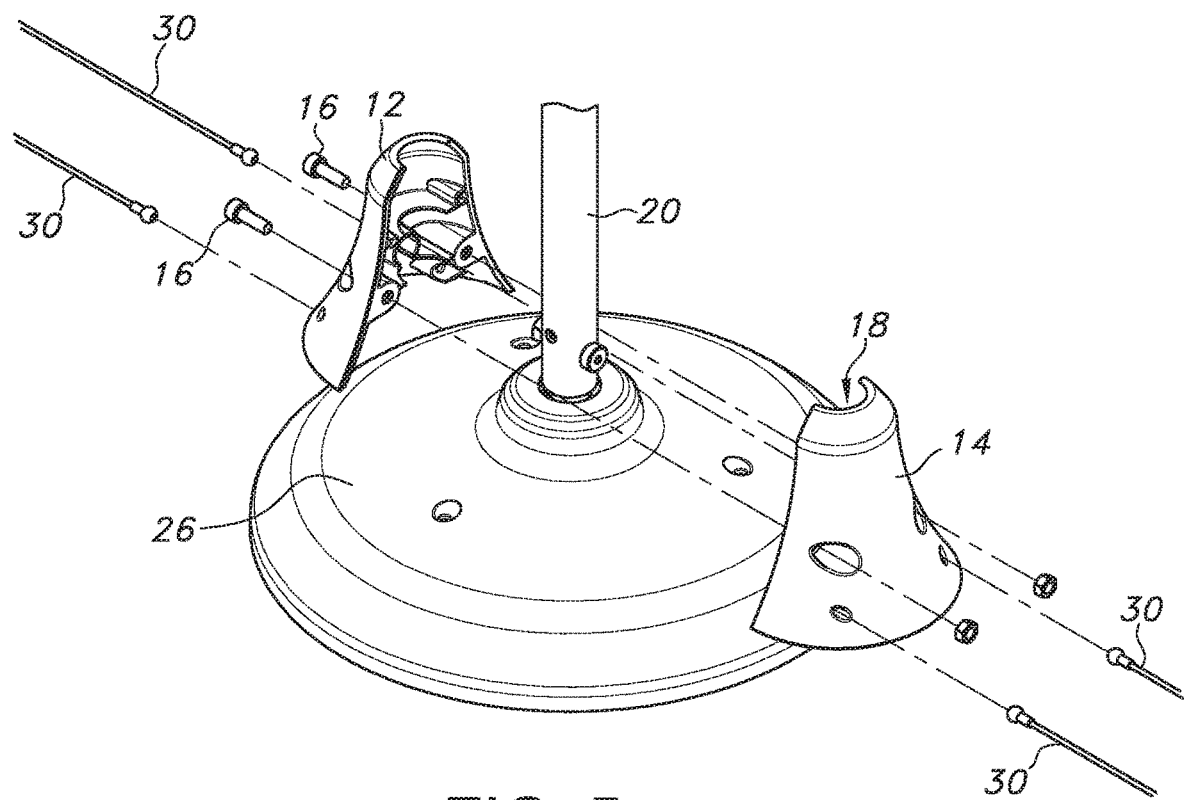
FIG. 5 shows the assembly of FIG. 3 in an exploded view, illustrating the manner in which the various components are assembled.

As shown in FIGS. 4-5, the complementary portions 12, 14 may also be identical to one another, which may reduce complexity and cost of production. The joined complementary portions 12, 14 of the connector 10 may be shaped like a trim piece for the ceiling fan 8, such as in the shape of a bell. For example, the assembled connector 10 may flare from a relatively smaller diameter at a top of the connector to a relatively larger diameter at a bottom of the connector. The connector 10 may be adapted for connecting to the down rod 20 such that a bottom of the connector 10 is in contact with an upper housing cover 26 of the ceiling fan 8. In another aspect, the bottom of the connector 10 may not contact the upper housing cover 26, but may be immediately adjacent the upper housing cover. For example, the bottom of the connector 10 may be less than 10 mm from the upper housing cover 26. More specifically, the bottom of the connector may be less than 5 mm, or more specifically, may be approximately 4.5 mm from the upper housing cover 26. In this way, the connector 10 may function as an apron with a visually continuous transition from the down rod 20 to the upper housing cover 26 of the fan housing.

Figure 6:
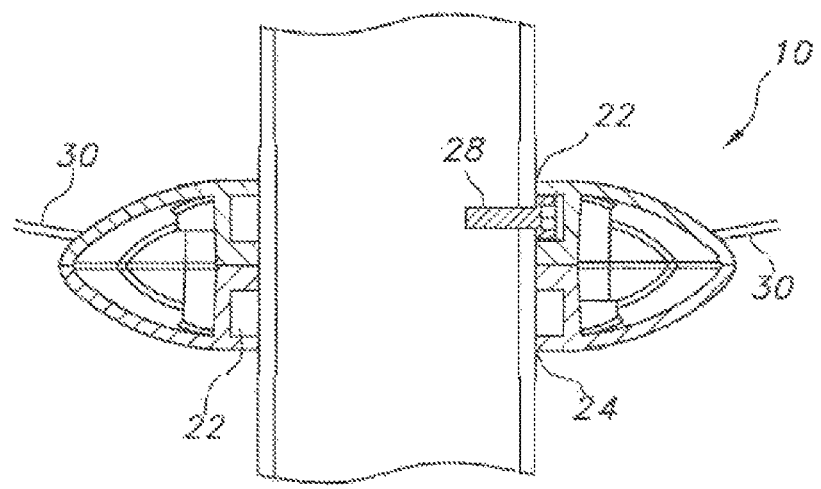
FIG. 6 is a cross-section of the assembly of FIG. 1, illustrating the manner in which a screw head may engage a groove about the circumference of the central opening in the guy wire anchor assembly.
Figure 7:
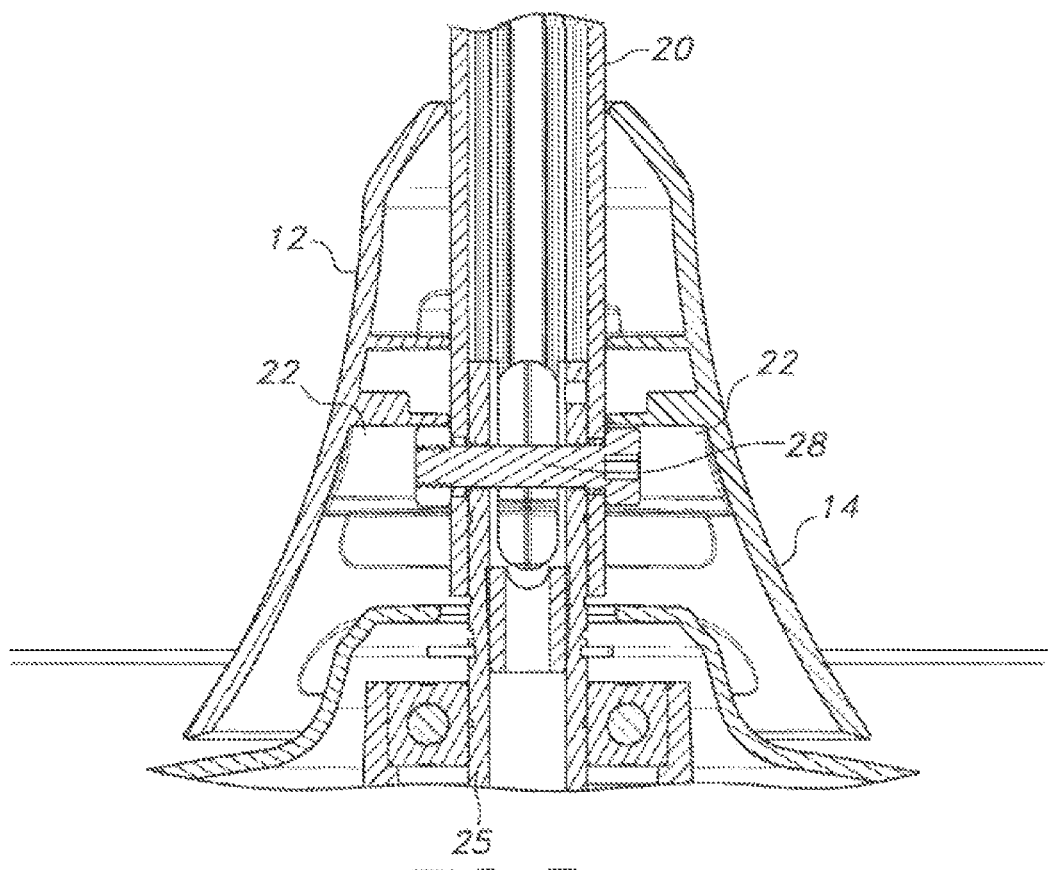
FIG. 7 is a cross-section of the assembly of FIG. 3, illustrating the manner in which a screw head and associated nut may be located in a recess or groove about the circumference of the central opening in the guy wire anchor assembly.

In addition, a receiver in the form of an annular recess or groove 22 is formed in the interior wall 24 of one or both of the portions 12, 14 surrounding the passage 18. A fastener 28 may be attached to the side of the down rod 20 and project into the annular recess or groove 22, as shown in FIG. 6. This fastener 28 may be a screw or bolt and nut as illustrated, and may project radially outward from the down rod 20. Both the head of the fastener (screw) and associated nut may be located in this groove 22. The fastener 28 may also adapted to connect the down rod 20 to a motor shaft 25 of the ceiling fan 8, as shown in FIG. 7. The head of the screw 28 may extend into an aperture in the down rod 20, thereby creating a positive lock to prevent the assembly from sliding axially, yet permitting rotational movement.

Figure 8:
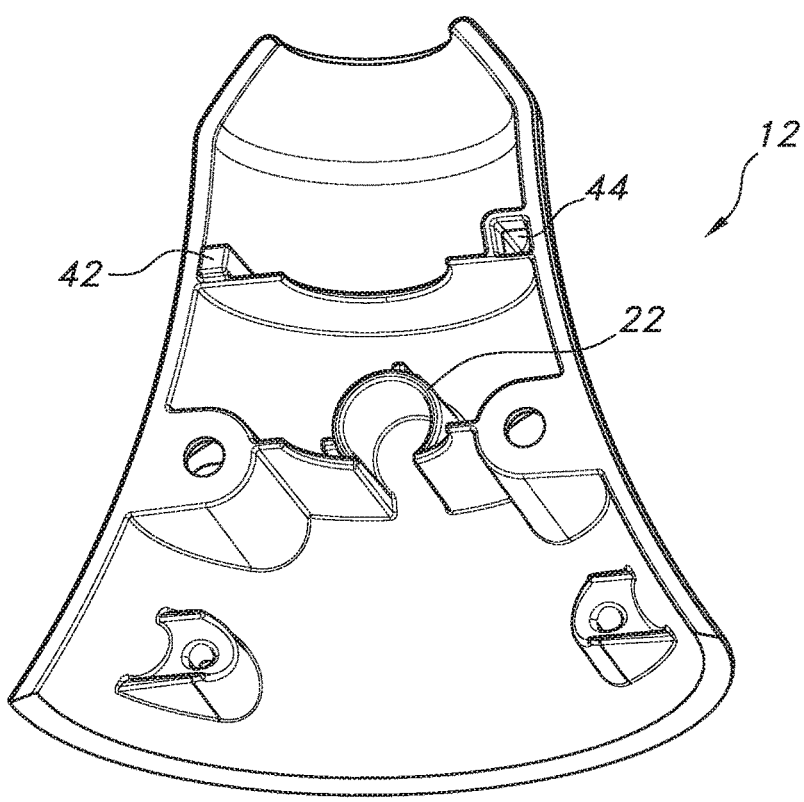
FIG. 8 is a perspective view of a first separable portion of the trim guy wire connector of FIG. 3.
Figure 9:
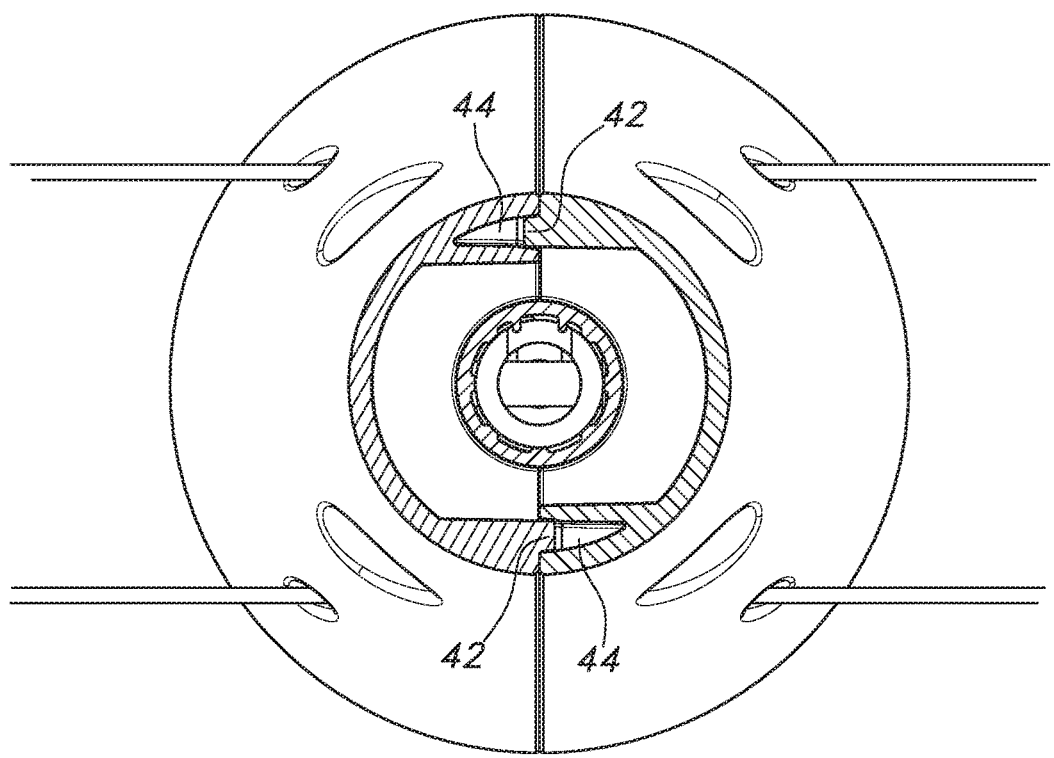
FIG. 9 is a top cross-sectional view of the assembly of FIG. 3, also highlighting the alignment features of the guy wire anchor assembly.

In a further aspect, the complementary portions 12, 14 may include alignment features adapted to align the complementary portions 12, 14 for assembly. As can be seen in FIGS. 8 and 9, the alignment features may comprise a protrusion 42 and a receiver 44. Each complementary portion may include both a protrusion 42 and a receiver 44, such that when the complementary portions are mated, the receiver 44 is adapted to accept the protrusion 42 and restrict relative movement between the complementary portions, such as during assembly.

Figure 10:
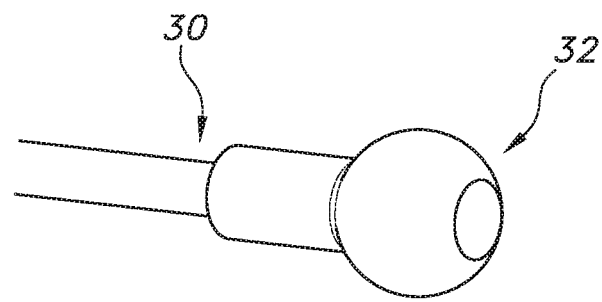
FIG. 10 illustrates a guy wire with a ferrule type anchor.

As shown in FIG. 10, each guy wire 30 has an anchor for associating with the connector 10. For example, the wire 30 may be provided with a ferrule 32 at one end, which may be formed in the shape of a ball or flange of larger diameter than the wire itself.

Figure 11:
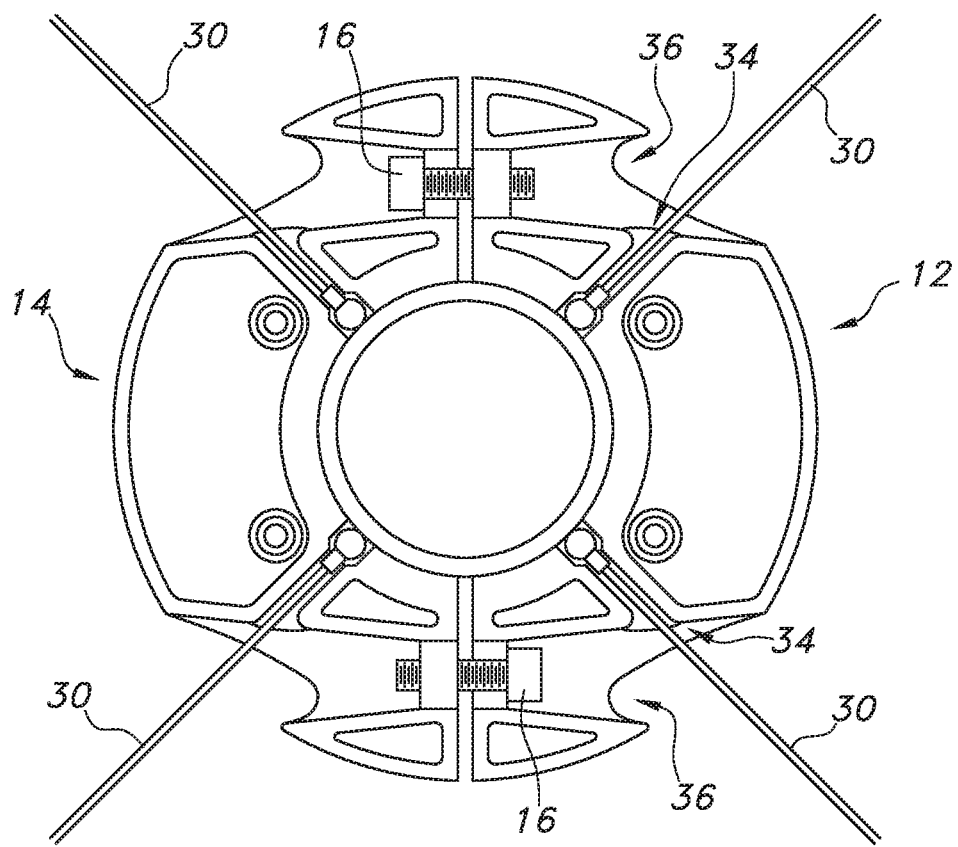
FIG. 11 is a top cross-sectional view of the assembly of FIG. 1.
Figure 12A:
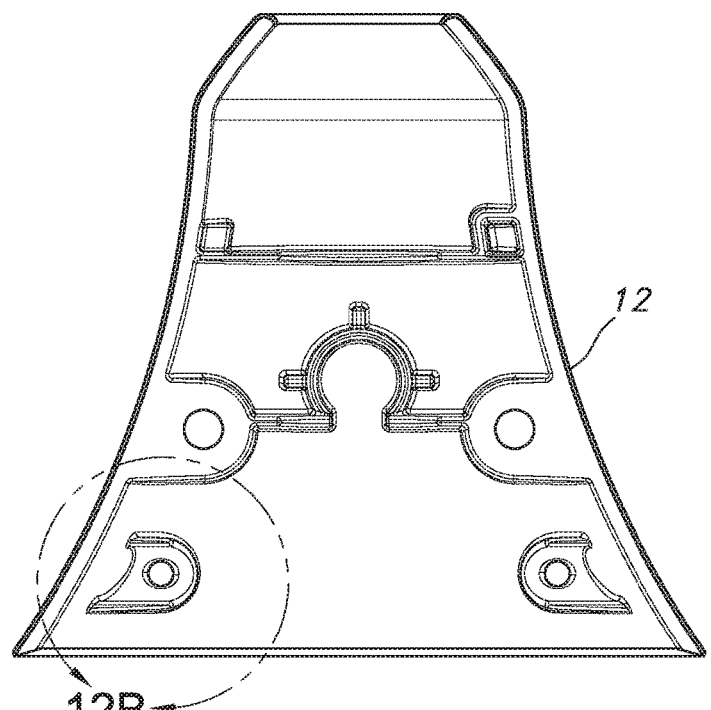
FIGS. 12A, 12B and 12C illustrate a seat in the trim guy wire connector for the anchor of FIG. 9.
Figure 12B:
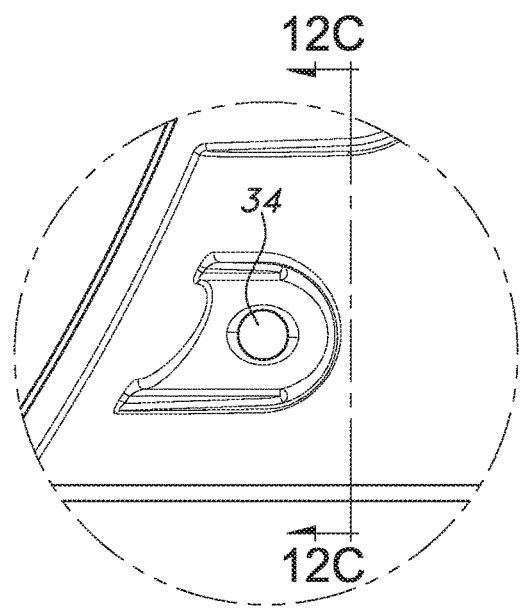
Figure 12C:
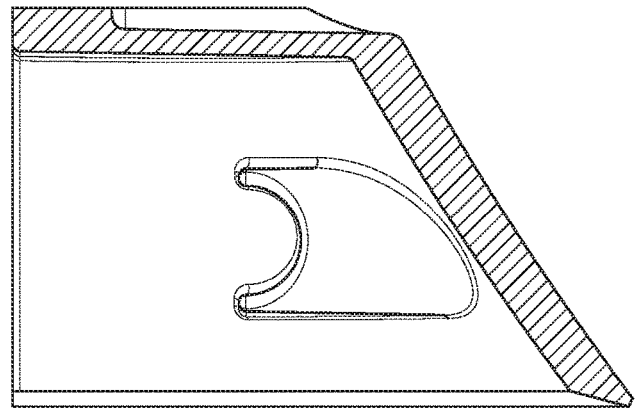
Figure 13:
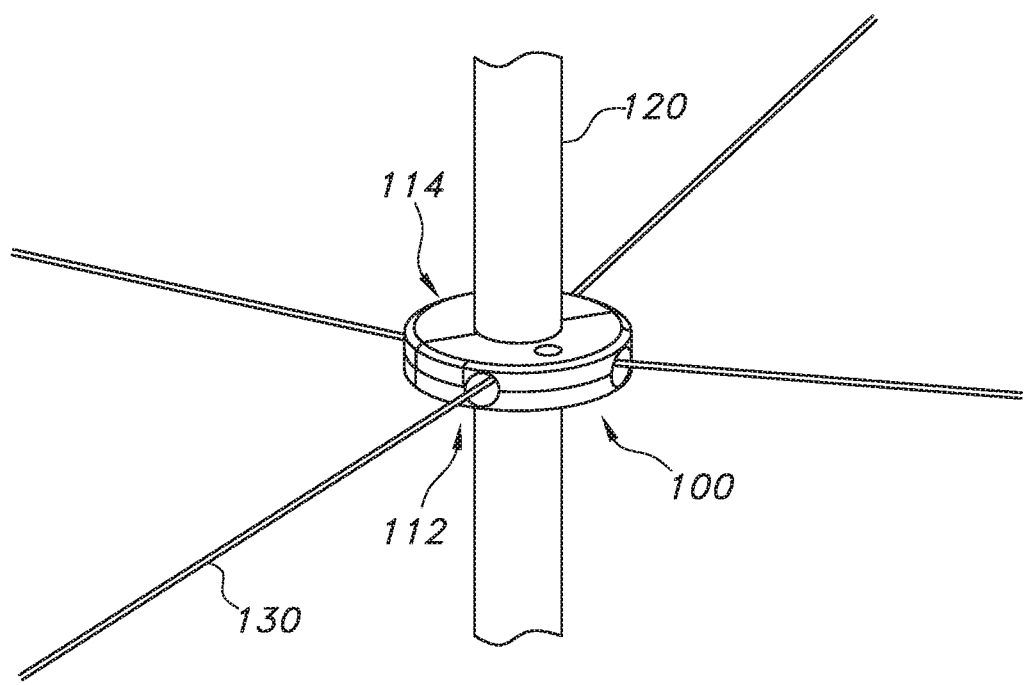
FIGS. 13 through 16 illustrate an alternate embodiment of the connector.
Figure 14:
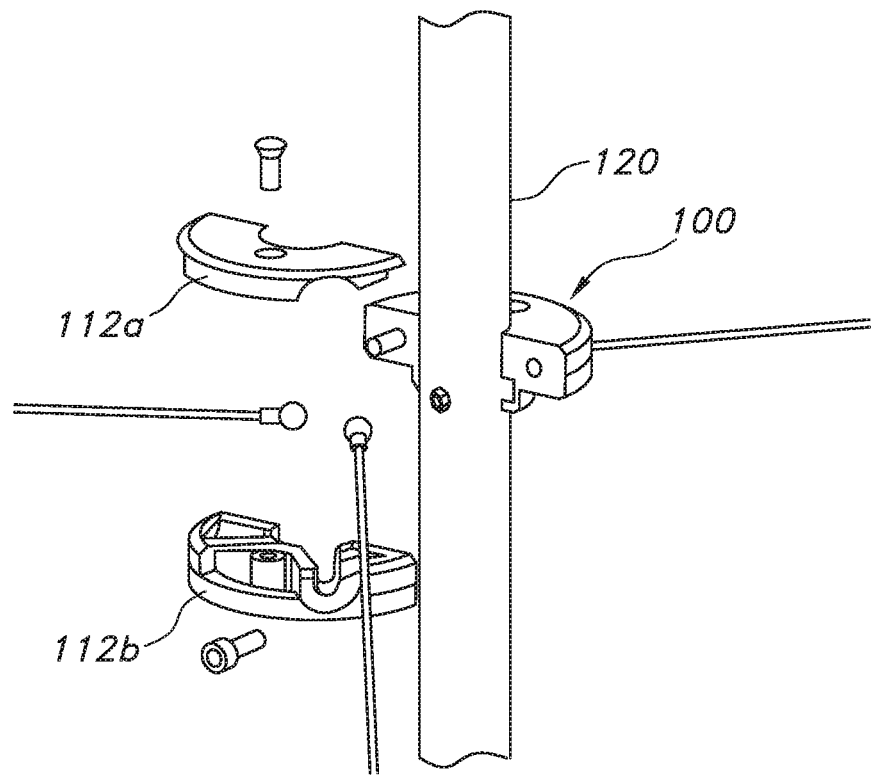
Figure 15:
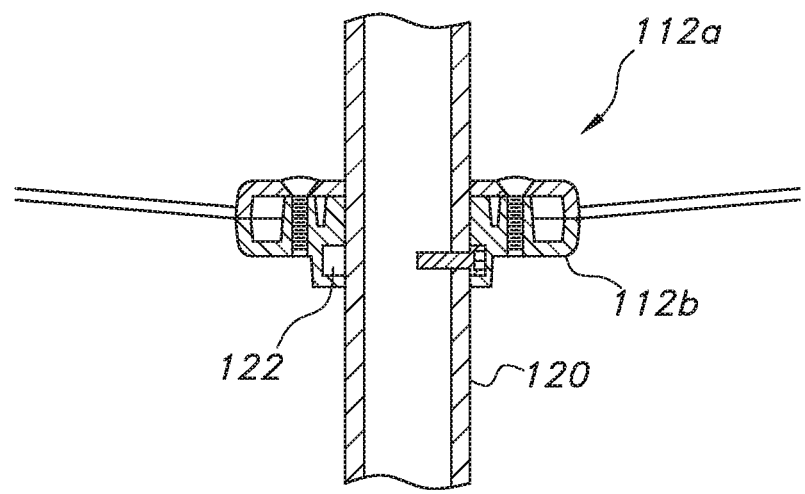
Figure 16:
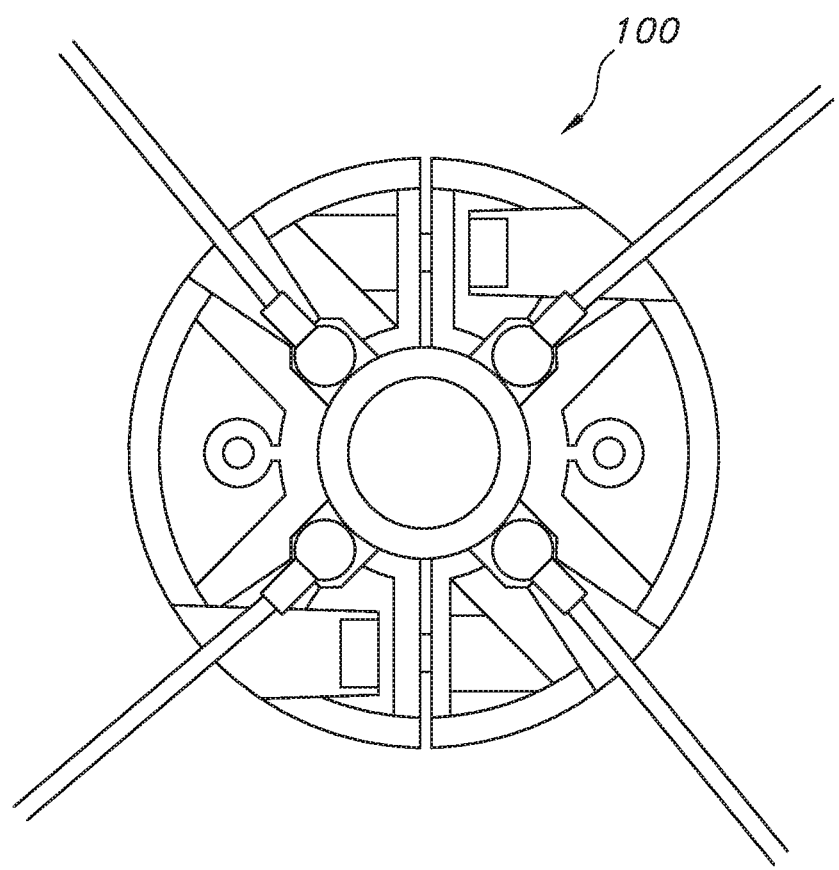

As demonstrated in FIGS. 11 and 12, passages in the form of tubular channels 34 are formed within the portions 12, 14 of the connector 10 to permit passage of the guy wires. These channels 34 are configured such that so that their inner end, adjacent to the passage 18 in the assembly, is large enough to accommodate the larger diameter of the ferrule 32, while the outer portion of the channels is smaller in diameter so that it accommodates the wire itself but does not permit passage of the anchor through the channel. When each guy wire 30 is passed through its corresponding channel 34, it becomes captive as the ferrule 32 enters the larger inboard end of the channel and encounters the restriction of the reduced diameter of the outboard portion of the channel. Hence, movement in the radial direction is reliably resisted.

The geometric arrangement of the guy wire channels 34 may be such that the wire 30 exits the connector 10 through the same peripheral aperture 36 accommodating the attachment screw, as can be seen in FIG. 10 (and which extends such that a longitudinal axis of the aperture 36 is generally parallel with a line tangent to the down rod 20). Hence, the channels 34 may be said to intersect with the apertures 36, which thus also form passages. This simplifies the overall shape of the device and provides uniform radial spacing from each guy wire 30 to the next around the perimeter.

Using the above combination of features results in a connector 10 providing several advantages heretofore unknown. First of all, security of attachment is not dependent on friction alone, and the guy wires will remain positively attached even if the screws holding the two halves of the connector 10 together should become loose. At the same time, because the engagement with the fastener 28 may be established within a continuous circumferential groove 22, the feature does not impose any restriction on the rotational orientation of the assembly, so that the wires 30 may be directed to the most optimal locations on the building structure at the time of installation.

In an alternate embodiment, as shown in FIGS. 13-16, the connector 100 for guy wires 130 is configured to fit a smaller diameter down rod 120. In this embodiment, the upper and lower parts 112a, 112b; 114a, 114b of each portion or section 112, 114 of the device are not identical and require separate molds or casting dies, and there are other minor detail differences resulting from the difference in scale; but the configuration is conceptually similar to the first embodiment described above, in that one of the portions 112, 114 includes an annular groove 122 for permitting rotation relative to the down rod 120, but resisting movement in an axial direction.

Figure 17:
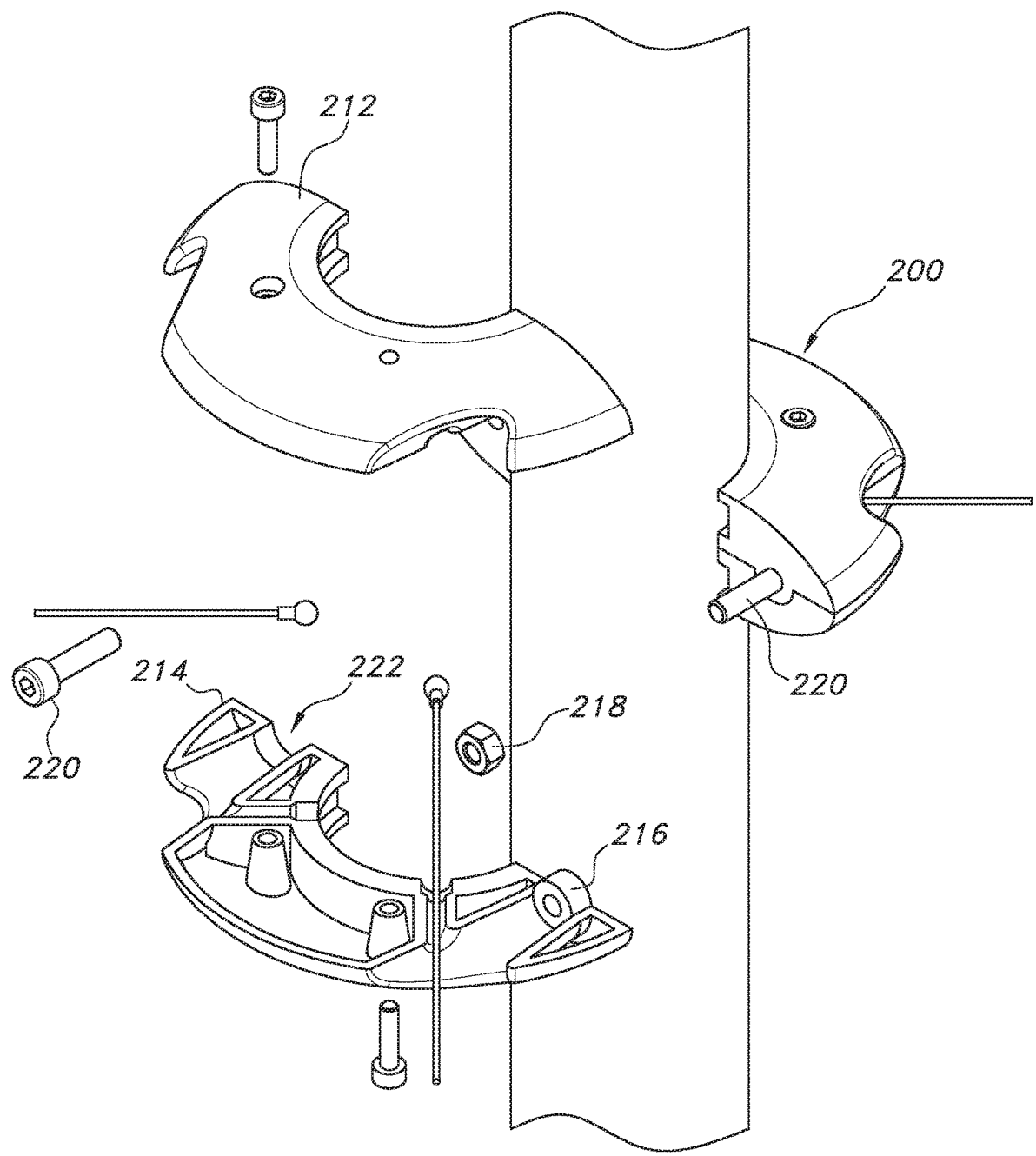
FIG. 17 illustrates another possible embodiment of the connector.
Figure 18:
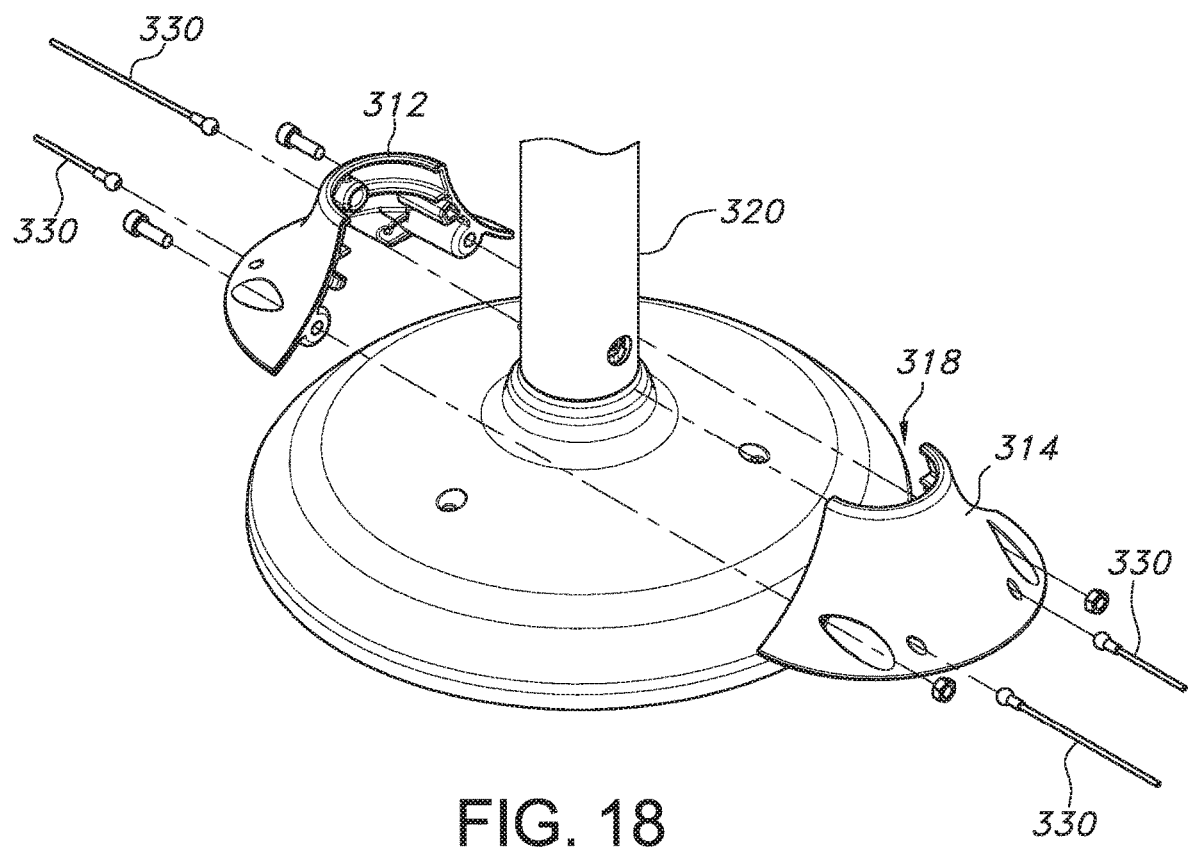
FIGS. 18 through 21 illustrate an alternate embodiment of the connector.

FIG. 17 illustrates a further embodiment in which the connector 200 is made of two identical portions or halves 212, 214. Each includes a receiver, such as a pocket 216, for receiving a nut 218, which thus may receive the fastener, such as bolt 220 associated with the other portion of the connector. The receiver 216 may be of a diameter such that the nut 218 is received therein, but then held against relative rotation to allow for threading of the fastener (bolt 220). A cutout 222 on the opposite side is adapted to receive the pocket 216 when the portions or halves 212, 214 are mated. Using this arrangement, all four portions forming the connector may be made using a single mold, thereby reducing manufacturing complexity and expense.

In another embodiment, as shown in FIGS. 18-21, a guy wire trim connector 310 may be adapted for connecting to a second down rod 320 in order to secure guy wires 330 thereto. The second down rod 320 may be a wide down rod, such as one having a diameter of approximately 45 mm. The guy wire trim connector 310 illustrated in FIGS. 17-20 may include a number of features corresponding to those of the first guy wire trim connector 10 of FIGS. 1-12, and are illustrated with corresponding reference numerals. Unless indicated otherwise, the correspondingly numbered elements of the connector 310 of FIGS. 17-20 parallel and function similarly to those elements of connector 10 of FIGS. 1-12.

Figure 19:
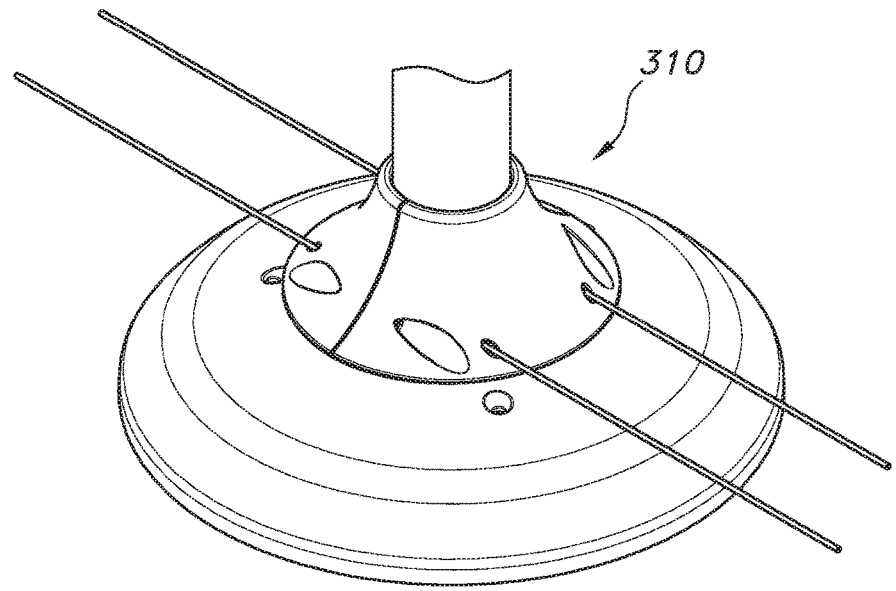
Figure 20:
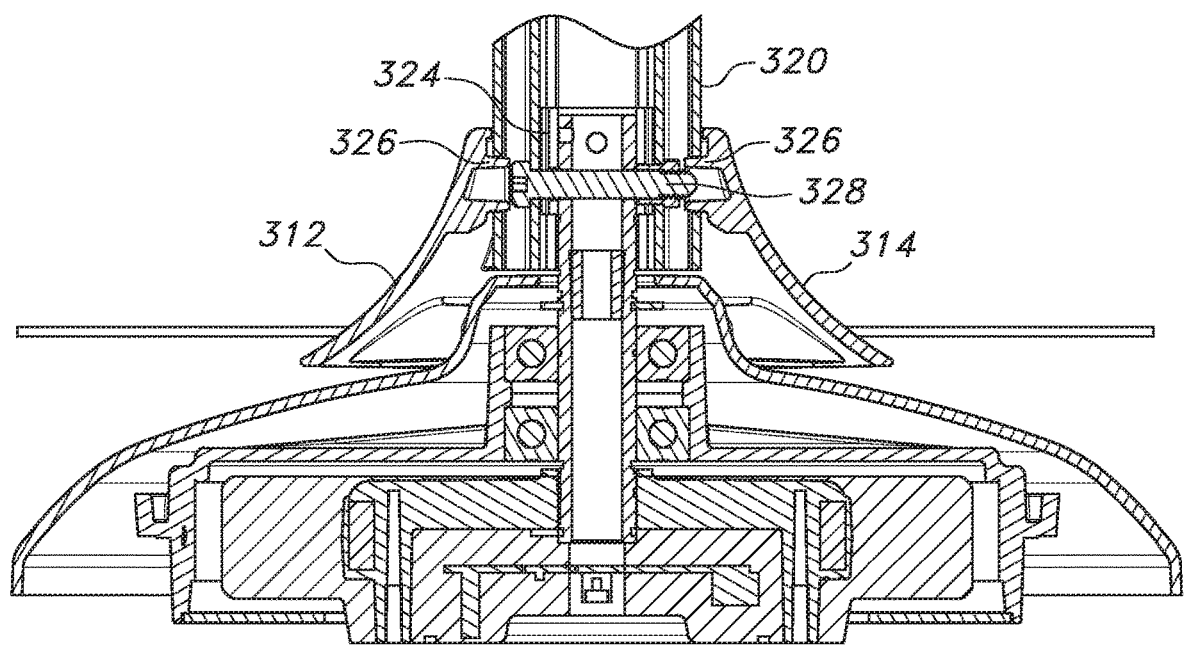
Figure 21:
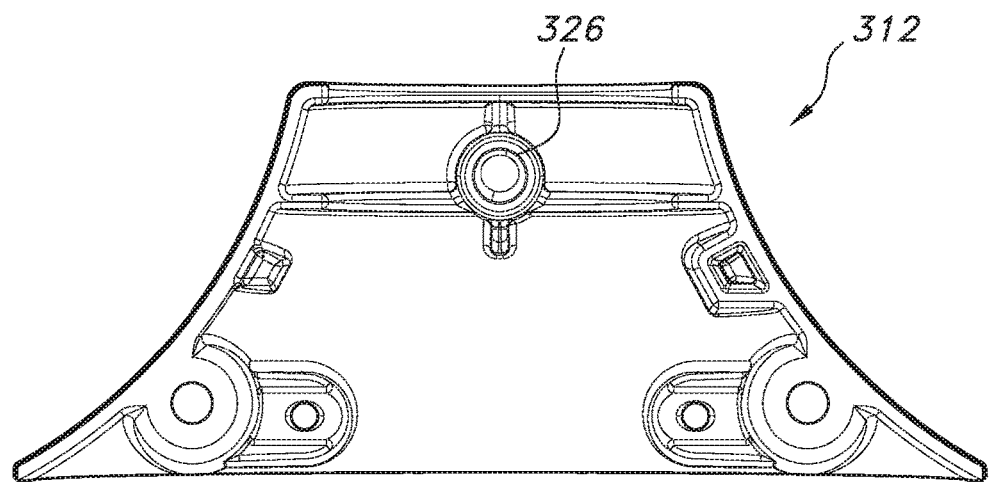

The second down rod 320 may include an outer diameter that is larger than an outer diameter of the motor shaft 324. As can be seen in FIG. 19, the second down rod 320 may include an inner diameter spaced from, and with a gap between it and the outer diameter of the second down rod 320. The motor shaft 324 may be adapted to connect to the inner diameter of the second down rod 320 via a fastener 328. The outer diameter of the second down rod 320 may include an outer aperture, and the inner diameter may include an inner aperture, which may be aligned with the outer aperture. This inner aperture may be aligned with a motor shaft aperture, such that the fastener 328 may pass through the inner aperture of the second down rod 320 and the motor shaft aperture, as illustrated in FIG. 20. In one aspect, the outer aperture of the down rod 320 may be larger than the inner aperture of the second down rod, such that the fastener 328 may pass fully through the outer aperture, and be retained entirely within the inner diameter of the second down rod 320. Such a configuration may leave the outer aperture of the second down rod 320 open upon assembly of the fan with the mount.

As with the first embodiment of the connector 10, the connector 310 may include a wall or projection 326, which may form a recess. As shown in FIG. 20, the projection 326 may be adapted to extend into the circular aperture 318 for the down rod 320. Upon assembly, the projection 326 may be adapted to align with the outer aperture of the down rod 320. Thus, upon assembly, the complementary portions 312, 314 of the connector 310 may be longitudinally fixed on the down rod so as to prevent longitudinal movement of the connector 310. In one aspect the projection 326 may include an internal recess, which may engage the fastener 328. In another aspect, as illustrated, the projection 326 may not engage the fastener 328 upon assembly.

Each of the following terms written in singular grammatical form: "a", "an", and the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase "consisting essentially of." Each of the phrases "consisting of" and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, generally, etc., as used herein, refer to ±10% of the stated numerical value or as close as possible to a stated condition.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

The invention claimed is:

1. An apparatus for connecting one or more guy wires to a down rod associated with a ceiling fan, comprising:
   a connector comprising first and second separable portions together forming an aperture for receiving the down rod, at least one of the first or second portions adapted to releasably receive a portion of the guy wire;
   wherein the guy wire has an anchor, and the first or second portion includes a first passage adapted for capturing the anchor so as to preclude movement in a radial direction.

2. The apparatus of claim 1, wherein the down rod includes a projection, and at least one of the first or second portions includes a groove for receiving the projection of the down rod so as to preclude axial movement of the connector while permitting rotational movement.

3. The apparatus of claim 1, wherein the first and second separable portions are identical.

4. The apparatus of claim 1, wherein each of the first and second portions comprises an upper part and a lower part.

5. The apparatus of claim 4, wherein the upper part is identical to the lower part.

6. The apparatus of claim 1, further including a second passage formed in each portion for receiving a fastener, the second passage having a longitudinal axis generally parallel to a tangent to the down rod.

7. The apparatus of claim 6, wherein the first passage intersects with the second passage.

8. A ceiling fan in combination with the apparatus of claim 1.

9. A method of manufacturing the connector of claim 1, comprising molding the first and second portions using a single mold.

10. An apparatus for connecting one or more guy wires to a down rod having a projection and associated with a ceiling fan, comprising:
    a connector including first and second separable portions together forming an aperture for receiving the down rod, at least one of the first or second portions including a receiver comprising a groove for receiving the projection of the down rod so as to preclude axial movement of the connector while permitting rotational movement.

11. The apparatus of claim 10, wherein at least one of the first or second portions includes at least one passage adapted for releasably receiving an end of the guy wire.

12. The apparatus of claim 11, wherein the guy wire has an anchor, and the passage is adapted for capturing the anchor so as to preclude movement in a radial direction.

13. The apparatus of claim 10, wherein each of the first and second portions comprises an upper part and a lower part.

14. A ceiling fan in combination with the apparatus of claim 10.

15. A method of manufacturing the connector of claim 10, comprising molding the first and second portions using a single mold.

16. A method of supporting a ceiling fan, comprising:
    assembling a connector to a down rod associated with the ceiling fan, the connector comprising first and second separable portions forming a first passage for receiving the down rod, the connector further including at least one second passage; and
    releasably connecting a guy wire with an anchor to the connector, said connecting step comprising capturing the anchor with the second passage of the connector.

* * * * *